UNITED STATES PATENT OFFICE 2,501,896

DICHLOROVINYL ETHERS

Charles Graenacher, Riehen, and Eduard Usteri and Max Geiger, Basel, Switzerland, assignors to Ciba Limited, Basel, Switzerland, a Swiss firm No Drawing. Application October 10, 1946, Serial No. 702,362. In Switzerland October 19, 1945

7 Claims. (Cl. 260—612)

According to this invention dichlorovinyl ethers are made by causing a compound of the general formula

R—O—A in which R represents an aromatic radical, and A represents an alkali metal, to react with trichlorethylene in the presence of a suitable solvent.

The dichlorovinyl ethers obtainable in this manner are compounds of the probable general formula $$R-O-\overset{X}{\underset{|}{C}}=\overset{X}{\underset{|}{C}}-Cl$$

in which R represents an aromatic radical, and one X represents a hydrogen atom and the other X a chlorine atom. The position of the chlorine atoms is not known with certainty; it is assumed that they are distributed in the α- and β-positions. These dichlorovinyl ethers are high boiling, liquid or solid crystalline compounds, which are stable to boiling water, boiling dilute aqueous-alcoholic solutions of hydrochloric acid or dilute alcoholic solutions of caustic alkalies, and which find application as intermediate products for a very wide range of uses, for example, for the dyestuff industry.

As compounds of the above general formula there may be used the alkali metal salts, for example, the potassium or more especially the sodium salts, of phenol and its derivatives, for example, para-chloro-phenol, para-bromo-phenol, 3:4-dichloro-phenol, 2:4-dichloro-phenol, 2:4-dibromo-phenol, 2:5-dichloro-phenol, 2:4:5-trichlorophenol, tetrachloro-phenol, pentachlorophenol, 4 - chloro-2-aminophenol, ortho - cyclohexyl-parachloro-phenol, ortho-hydroxy-acetophenone, 4:4' - dihydroxydiphenyl - dimethylmethane, 4-hydroxy-triphenyl methane, 4:4''-dichloro-4-hydroxy-triphenylmethane, para-hydroxydiphenyl, para - nitrophenol, 2 - hydroxy-5:4'-dichloro-diphenyl-methane, and also the aforesaid salts of β-naphthol, 1:4-chloronaphthol or the like.

Those are suitable solvents which dissolve the reaction components but do not react with trichlorethylene, and among them, the ones containing an OH-group are of particular usefulness. As such there may be used either water or an organic solvent containing water or free from water, especially an aliphatic alcohol, for example ethyl alcohol, isopropyl alcohol or tertiary amyl alcohol, and furthermore phenols and the like.

The trichlorethylene is advantageously used in a small excess. In many cases the reaction proceeds at ordinary pressure by boiling in a reflux apparatus. However, it is more advantageous to work with the application of pressure at a raised temperature, in which case the duration of the reaction can be varied within wide limits depending on the temperature chosen.

The following examples illustrate the invention, the parts being by weight unless otherwise stated, and the relationship of parts by weight to parts by volume being the same as that of the kilogram to the liter:

Example 1

20 parts of phenol are dissolved in a solution of 4.6 parts of sodium in 80 parts by volume of absolute alcohol, 30 parts of trichlorethylene are added to the resulting solution, and the mixture is heated for 25 hours in a closed vessel at 120–130° C. For the purpose of working up, the neutral reaction solution is taken up in water and ether, whereupon the precipitated sodium chloride simultaneously passes into solution. The ether layer is then washed with dilute caustic soda solution and water, and then dried with anhydrous sodium sulfate and the solvent is removed by distillation. The residue is fractionally distilled under reduced pressure. After a little predistillation the dichlorovinyl phenyl ether so obtained distils in the form of a colorless oil under a pressure of 14 mm. at 101–102° C.

Example 2

12.8 parts of para-chlorophenol are dissolved in a solution of 2.3 parts of sodium in 40 parts by volume of absolute alcohol, 15 parts of trichlorethylene are added to the resulting solution, and the mixture is heated for 24 hours in a closed vessel at 120–130° C. The reaction solution is worked up in the manner described in Example 1. The para - chlorophenol - dichlorovinyl - ether so obtained distils in the form of a colorless oil under a pressure of 13 mm. at 124–126° C.

If the same mixture is boiled for 3 days in a reflux apparatus, there is likewise obtained para-chlorophenol-dichlorovinyl ether but in a considerably poorer yield.

Instead of absolute alcohol, there may be used isopropyl alcohol, tertiary amyl alcohol or para-chlorophenol, in which case the sodium phenolate is first prepared, the latter is dissolved in the appropriate alcohol, and the reaction temperature is increased to 180–190° C.

The resulting para-chlorophenol-dichlorovinyl ether remains unchanged after boiling for 16 hours with water, and also after boiling for 24 hours with a dilute aqueous-alcoholic solution of hydrochloric acid and after boiling for 5 hours with an 0.5N-alcoholic solution of caustic potash.

*Example 3*

17.5 parts of 3:4-dichlorophenol are dissolved in a solution of 2.3 parts of sodium in 40 parts by volume of absolute alcohol. 15 parts of trichlorethylene are then added, and the mixture is heated for 24 hours in a closed vessel at 180–190° C. After cooling, the reaction mixture is worked up in a manner similar to that described in Example 1. The resulting 3:4-dichlorophenol-dichlorovinyl ether distils under 15 mm. pressure at 152–154° C.

In the same manner there may be used in the reaction 17.5 parts of 2:5-dichlorophenol or 17.5 parts of 2:4-dichlorophenol or 20 parts of trichlorophenol or 23 parts of tetrachlorophenol, and the reaction mixture worked up in the same manner, whereby the corresponding dichlorovinyl ether is obtained. The resulting 2:5-dichlorophenol-dichlorovinyl ether distils at 143° C. under 12 mm. pressure, the 2:4-dichlorophenol-dichlorovinyl ether distils at 151–154° C. under 15 mm. pressure, the resulting 2:4:5-trichlorophenol-dichlorovinyl ether, after being distilled twice, passes over at 161–163° C. under 12 mm. pressure, and the resulting tetrachlorophenol-dichlorovinyl ether distils at 178–181° C. under 12 mm. pressure.

*Example 4*

20 parts of penta-chlorophenol are dissolved in a solution of 1.75 parts of sodium in 30 parts by volume of absolute alcohol, 10 parts of trichlorethylene are added and the mixture is heated for 24 hours in a closed vessel at 180–190° C. The reaction mixture is worked up in a manner analogous to that described in Example 1. The resulting penta-chlorophenol-dichlorovinyl ether passes over at 194–196° C. under 12 mm. pressure, and crystallises upon cooling.

*Example 5*

21 parts of ortho-cyclohexyl-para-chlorophenol are dissolved in a solution of 2.3 parts of sodium in 40 parts by volume of absolute alcohol, 15 parts of trichlorethylene are then added, and the mixture is heated for 24 hours in a closed vessel at 120–130° C. The reaction solution is worked up in a manner corresponding to that described in Example 1. The resulting ortho-cyclohexyl-para-chlorophenol-dichlorovinyl ether passes over at 148–153° C. under 0.02 mm. pressure.

By using 15.6 parts of 2-hydroxy-5:4'-dichlorodiphenylmethane for the reaction, instead of the ortho-cyclohexyl-para-chlorophenol there is obtained the corresponding dichlorovinyl ether which distils in the form of a colorless oil at 159–161° C. under 0.005 mm. pressure.

*Example 6*

12 parts of 4:4'-dihydroxydiphenyl-dimethylmethane are dissolved in a solution of 2.3 parts of sodium in 40 parts by volume of absolute alcohol, 15 parts of trichlorethylene are then added, and the mixture is heated for 24 hours in a closed vessel at 120–130° C. The mixture is worked up in the manner described in Example 1. The resulting dichlorovinyl ether of 4:4'-dihydroxydiphenyl-dimethyl-methane, after being distilled twice, passes over at 216–218° C. under 0.01 mm. pressure.

By using 4-hydroxytriphenylmethane or 4':4''-dichloro-4-hydroxy-triphenylmethane, instead of 4:4'-dihydroxydiphenyl-dimethyl-methane, and carrying out the reaction and working up in an analogous manner, the corresponding dichlorovinyl ether is obtained. The dichlorovinyl ether of 4-hydroxytriphenylmethane passes over at 204–208° C. under 0.02 mm. pressure, and that of 4':4''-dichloro-4-hydroxy-triphenylmethane distils at 220–224° C. under 0.02 mm. pressure.

*Example 7*

18 parts of para-hydroxydiphenyl are dissolved in a solution of 2.3 parts of sodium in 40 parts by volume of absolute alcohol, while warming, 15 parts of trichlorethylene are added, and the mixture is boiled for 3 days in a reflux apparatus. The reaction does not proceed to completion. The reaction solution is worked up in the manner described in Example 1. The isolated para-hydroxydiphenyl-dichlorovinyl ether distils at 147–151° C. under 0.02 mm. pressure, and solidifies to a crystalline magma. It melts at 50–51° C.

*Example 8*

14 parts of para-nitrophenol are introduced into a solution of 2.3 parts of sodium in 60 parts by volume of absolute alcohol, the whole is heated for ¼ hour on the water bath, 15 parts of trichlorethylene are then added, and the mixture is heated for 24 hours in a closed vessel at 180–190° C. The reaction solution is worked up in the manner described in Example 1. The resulting para-nitrophenol-dichlorovinyl ether, after being distilled twice, passes over at 136–138° C. under 0.07 mm. pressure in the form of a yellowish oil.

*Example 9*

15 parts of β-naphthol are dissolved in a solution of 2.3 parts of sodium in 40 parts by volume of absolute alcohol, 15 parts of trichlorethylene are then added, and the mixture is heated for 24 hours in a closed vessel at 120–130° C. The reaction solution is worked up in a manner analogous to that described in Example 1. The resulting β-naphthol-dichlorovinyl ether distils at 141–142° C. under 0.1 mm. pressure.

*Example 10*

17.9 parts of 1:4-chloronaphthol are dissolved in a solution of 2.3 parts of sodium in 40 parts by volume of absolute alcohol, 15 parts of trichlorethylene are added, and the mixture is boiled in a closed vessel for 15 hours at 120–130° C. The reaction mixture is worked up in the manner described in Example 1. The resulting 1:4-chloronaphthol-dichlorovinyl ether, after being distilled twice, passes over at 147–149° C. under 0.1 mm. pressure in the form of a pale yellow oil.

*Example 11*

15 parts of trichlorethylene are added to a solution of 4 parts of sodium hydroxide and 12.8 parts of para-chlorophenol in 40 parts by volume of aqueous alcohol of 75 per cent. strength, and the mixture is heated for 20 hours in a closed vessel at 120–130° C. The reaction mixture is worked up in the manner described in Example 1. There is obtained para - chloro - phenol - dichlorovinyl ether boiling at 124–126° C. under 13 mm. pressure.

*Example 12*

4 parts of sodium hydroxide and 12.8 parts of para-chlorophenol are dissolved in 40 parts by volume of water, 15 parts of trichlorethylene are added, and the non-homogeneous reaction mixture is heated for 20 hours in a closed vessel at 120–130° C. The reaction mixture is worked up in a manner analogous to that described in Example 1. There is obtained para-chlorophenol-dichlorovinyl ether.

In an analogous manner phenol-dichlorovinyl ether may be obtained by the reaction of a solution of 11.5 parts of sodium phenolate in 30 parts by volume of water with 15 parts of trichlorethylene in a closed vessel for 20 hours at 120–130° C.

*Example 13*

22 parts of 4-chloro-2-aminophenol are dissolved in a solution of 3.4 parts of sodium in 100 parts by volume of alcohol, 22 parts of trichlorethylene are added, and the mixture is heated for 15 hours in a closed vessel at 120–130° C. For the purpose of working up the reaction product the greater part of the alcohol is first removed by distillation, the residue is then taken up in water and ether and further treated in the manner described in Example 1. There is thus obtained 4-chloro-2-aminophenol-dichlorovinyl ether, which distils at 173–177° C. under 16 mm. pressure in the form of a colorless oil. The compound is soluble in dilute hydrochloric acid and is again precipitated by the addition of alkali.

*Example 14*

14 parts of ortho-hydroxy-acetophenone are added to a solution of 2.3 parts of sodium in 40 parts by volume of absolute alcohol, 15 parts of trichlorethylene are then added, and the mixture is heated at 130–140° C. for 20 hours in a closed vessel. The product is then worked up in the manner described in Example 1. There is obtained a good yield of ortho-hydroxy-acetophenone-dichlorovinyl ether boiling at 148–153° C. under 12 mm. pressure.

What we claim is:
1. Dichlorovinyl ethers of the general formula

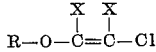

wherein R represents an aromatic radical and one X stands for a chlorine atom and the other X stands for a hydrogen atom.

2. Dichlorovinyl ethers of the general formula

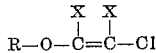

wherein R represents a radical of the benzene series substituted by halogen and one X stands for a chlorine atom and the other X stands for a hydrogen atom.

3. Dichlorovinyl ethers of the general formula

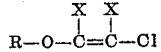

wherein R represents a radical of the benzene series substituted by chlorine and one X stands for a chlorine atom and the other X stands for a hydrogen atom.

4. Dichlorovinyl ethers of the general formula

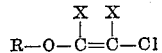

wherein R represents the radical of para-chlorophenol and one X stands for a chlorine atom and the other X stands for a hydrogen atom.

5. Dichlorovinyl ethers of the general formula

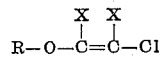

wherein R represents the radical of 3:4-dichlorophenol and one X stands for a chlorine atom and the other X stands for a hydrogen atom.

6. Dichlorovinyl ethers of the general formula

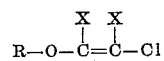

wherein R represents a radical of the naphthalene series and one X stands for a chlorine atom and the other X stands for a hydrogen atom.

7. Dichlorovinyl ethers of the general formula

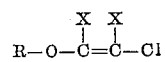

wherein R represents the radical of β-naphthol and one X stands for a chlorine atom and the other X stands for a hydrogen atom.

CHARLES GRAENACHER.
EDUARD USTERI.
MAX GEIGER.

REFERENCES CITED

The following references are of record in the file of this patent:

UNITED STATES PATENTS

| Number | Name | Date |
|---|---|---|
| 797,024 | Sparre | Aug. 15, 1905 |
| 2,109,514 | Van Duzee et al. | Mar. 1, 1938 |
| 2,133,297 | Jones | Oct. 18, 1938 |
| 2,135,123 | Coleman et al. | Nov. 1, 1938 |
| 2,170,990 | Coleman et al. | Aug. 29, 1939 |

FOREIGN PATENTS

| Number | Country | Date |
|---|---|---|
| 216,940 | Germany | Dec. 13, 1909 |
| 539,697 | Great Britain | Sept. 22, 1941 |

OTHER REFERENCES

Slimmer, Berichte, vol. 36, 290 (1903).
Sabanejeff, Annalen, vol. 216, 282–3 (1882).
Michael, Am. Chem. Soc., vol. 9, 208–9 (1887).